United States Patent
Kang et al.

(10) Patent No.: US 8,396,887 B2
(45) Date of Patent: Mar. 12, 2013

(54) METHOD AND SYSTEM FOR FACILITIES MANAGEMENT

(75) Inventors: Joo Seok Kang, Seoul (KR); Sook Hee Kim, Seoul (KR)

(73) Assignee: Solideo Systems Co., Ltd. (KR)

(*) Notice: Subject to any disclaimer, the term of this patent is extended or adjusted under 35 U.S.C. 154(b) by 55 days.

(21) Appl. No.: 13/127,923

(22) PCT Filed: Nov. 10, 2008

(86) PCT No.: PCT/KR2008/006623
§ 371 (c)(1),
(2), (4) Date: May 5, 2011

(87) PCT Pub. No.: WO2010/053221
PCT Pub. Date: May 14, 2010

(65) Prior Publication Data
US 2011/0208777 A1 Aug. 25, 2011

(30) Foreign Application Priority Data
Nov. 7, 2008 (KR) .................. 10-2008-0110588

(51) Int. Cl.
*G06F 17/30* (2006.01)
(52) U.S. Cl. ........................ 707/769; 707/802
(58) Field of Classification Search .................. 707/769
See application file for complete search history.

(56) References Cited

U.S. PATENT DOCUMENTS

| | | | |
|---|---|---|---|
| 5,920,860 A * | 7/1999 | Maheshwari et al. | 709/217 |
| 6,584,459 B1 * | 6/2003 | Chang et al. | 707/812 |
| 6,615,219 B1 * | 9/2003 | Bruso et al. | 707/699 |
| 6,683,622 B2 * | 1/2004 | Arsenault | 345/666 |
| 6,954,895 B1 * | 10/2005 | Oak | 715/201 |
| 2004/0080409 A1 * | 4/2004 | Reghetti et al. | 340/515 |
| 2004/0141612 A1 * | 7/2004 | Tsutsui et al. | 380/28 |
| 2007/0081189 A1 * | 4/2007 | Kamei et al. | 358/1.18 |
| 2008/0172605 A1 * | 7/2008 | Smith | 715/243 |
| 2009/0037477 A1 * | 2/2009 | Choi et al. | 707/104.1 |
| 2009/0148050 A1 * | 6/2009 | Reghetti et al. | 382/219 |
| 2010/0251028 A1 * | 9/2010 | Reghetti et al. | 714/39 |

FOREIGN PATENT DOCUMENTS

| | | |
|---|---|---|
| KR | 10-2004-0053002 | 6/2004 |
| KR | 10-2006-0006467 | 1/2006 |
| KR | 10-2007-0029974 | 3/2007 |
| KR | 10-0836235 | 6/2008 |
| WO | 2008/105611 | 9/2008 |

OTHER PUBLICATIONS

International Search Report—PCT/KR2008/006623 dated Jul. 24, 2009.

* cited by examiner

*Primary Examiner* — Binh V Ho
(74) *Attorney, Agent, or Firm* — Cantor Colburn LLP (57) ABSTRACT

A facility management system providing method includes the operations of storing an object file in a first database (DB) if an object is inserted into drawing information according to an application, wherein the object file includes object information about the inserted object, attribute information about the inserted object, and object space information based on a location on the drawing information into which the object is inserted, and updating object text information corresponding to the object file on the basis of the object space information in a second DB, wherein the second DB stores text information corresponding to the first DB.

11 Claims, 8 Drawing Sheets

| Classification | Approval stage | Duty design book | Type design book | Large class | Small class | Serial number | Building | Floor | Revision number | Korean language drawing name |
|---|---|---|---|---|---|---|---|---|---|---|
| Code | X | Y | Z | A | DD | EEE | aaa | bxxx | Rcc | ddddd |
| Number of digits | One alphabet digit | One alphabet digit | One alphabet digit | One alphabet digit | Two numerical digits | Combination of dash (-) and three numerical digits | Three numerical digits | One alphabet digit + Three numerical digits | R + Two numerical digits | Alphabet/numerical/korean character digits |
| Form of application | XYZ-ADD-EEE-aaabxxx-Rcc-ddddd |||||||||||
| Example of application (Example of application) | Permission | Basic design book | Drawing | Construction | Basic drawing plan view | First | Building A | First floor | Revision 1 | First floor plan view |
| Code of application | P | B | D | A | 31 | 001 | 001 | F001 | R01 | First floor plan view |
| Document name | PBD-A31-001-001F001-R01-1Floor plan view |||||||||||

METHOD AND SYSTEM FOR FACILITIES MANAGEMENT

TECHNICAL FIELD

The present invention relates to a method of providing a facility management system, and more particularly, to a system and method for efficiently performing facility management on the basis of drawings and text information by automatic connection of connecting data of a drawing file and information about an object to be inserted onto a drawing with data of a non-drawing file.

BACKGROUND ART

In general, designers of design firms, construction companies, land development companies, or product manufacturing companies make drawings using a computer-aided design (CAD) program and store the drawings in the form of a drawing file (for example, a file with extension DWG, a file with extension Design Web Format (DWF), a file with extension RML, or a KOrea Standard of Drawing Information in Construction (KOSDIC) file) in drawing file database.

In addition, text data written in the drawings is stored in the form of a document file in document file database, for example, DBMS, MySQL, PostgreSQL, SAPDB, miniSQL, Oracle, Informix, Sybase, MS-SQL, DB2, LDAP, UniSQL, or the like. In other words, the drawing file is stored and managed in the drawing file database, and a non-drawing file with a document file format is stored and managed in the document file database.

In general, when a drawing stored in the drawing file database is frequently corrected/changed by a designer, the correction/change of the drawing is not automatically reflected in a non-drawing file stored in the document file database. Accordingly, in order to enable a drawing file (or text data included in a drawing file) stored in the drawing file database to coincide with a non-drawing file (or text data included in a non-drawing file) stored in the drawing file database, a manager of the drawing file needs to notify a manager of the document file of the correction/change of the drawing, the manager of the drawing file needs to directly reflect the correction/change of the drawing in the document file, or the manager of the document file needs to directly reflect the correction/change of the drawing in the document file.

If time lapses without the manager of the drawing file or the manager of the document file directly reflecting the correction/change of the drawing in the document file, the consistency between the drawing file and the document file is greatly reduced. In addition, several objects may exist in a specific space. These objects are the assets of the space or facilities, and it is important to efficiently manage these assets.

The objects corresponding to the assets may be items simply located in the specific space, such as, a desk, pieces of furniture, and goods. An operation of inserting the objects into a drawing is needed to manage these assets. However, if objects are inserted onto a drawing, text information corresponding to the inserted objects needs to be automatically updated. In addition, since the object insertion does not require a complicated operation that is required for drawing files, the object insertion may be performed without a large-capacity and complicate program such as a drawing writing file.

If a predetermined application is provided to perform such object insertion, a method in which users can simply manage assets in a facility management system may be provided. A drawing file of facilities (for example, buildings) and an object file associated with several objects (for example, assets) located in the facilities are very important in managing the facilities. Authorized users may access the drawing file and the object file to correct or manage them, and update the drawing file and the object file.

At this time, if a user stores a drawing file or an object file at an erroneous logical location (for example, a folder) or arbitrarily changes the name of the drawing file or object file, an error may be generated in the entire facility management system. Accordingly, a file (for example, a drawing file, an object file, or the like) important for facility management needs to be encrypted and to be always stored only at a specific location according to a specific rule, and encrypted drawing files or object files needs to be able to provide some pieces of basic information even when these files are not decrypted.

DISCLOSURE OF INVENTION

Technical Problem

The present invention provides a method capable of connecting a drawing file (or data included in a drawing file) with a non-drawing file (or data included in a non-drawing file) and enabling an object corresponding to an asset to be inserted into a space to be consistent with the non-drawing file in real time.

The present invention also provides a method of effectively storing the drawing file or a file corresponding to the object. The present invention also provides convenience to users by allowing the users to recognize basic information such as preview information even when the drawing file or the file corresponding to the object is encrypted.

Advantageous Effects

In a method and system according to the present invention, when a drawing file (or data included in a drawing file) is corrected or predetermined object information is input to the drawing file, a non-drawing file (or data included in a non-drawing file) is automatically corrected, so that the drawing file or an object file operates together with the non-drawing file to achieve real-time data consistency.

In addition, files or data important for facility management is stored with standard file names and at standard locations regardless of file names or locations assigned by users, so that a malfunction or an error of the system may be reduced and effective data management may be performed. Moreover, although the files or data important for facility management are encrypted and managed, the files or data even in an encrypted state may provide preview information in order to reduce the inconvenience of users having to decrypt each file and check it to find a desired file. Therefore, a facility manager or a facility user may easily access the files or data important for facility management.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

According to an aspect of the present invention, there is provided a facility management system providing method including the operations of storing an object file in a first database (DB) if an object is inserted into drawing information according to an application, wherein the object file comprises object information about the inserted object, attribute information about the inserted object, and object space information based on a location on the drawing information into which the object is inserted; and updating object text information corresponding to the object file on the basis of the object information, the attribute information, and the object space information included in the object file in a second DB, wherein the second DB stores text information corresponding to the first DB.

The facility management system providing method may further include the operations of selecting a drawing file, wherein the selecting is performed by a client, and transmitting the drawing information corresponding to the selected drawing file to the client. The application is separate from a drawing manufacturing application for displaying the drawing file as the corresponding drawing information and making the drawing file. The application may display a result obtained by reflecting a symbol corresponding to the inserted object in the drawing information on the basis of the object space information.

The facility management system providing method may further include the operations of selecting space information, wherein the selecting is performed by a client, searching for information about the object located in a space corresponding to the selected space information from the second DB, and displaying the found information. The facility management system providing method may further include the operations of, if an attribute of the object inserted through the application is changed, updating the object file stored in the first DB on the basis of the changed attribute; and updating the object text information stored in the second DB on the basis of the changed attribute.

A file name of a drawing file corresponding to the drawing information is determined based on information about attributes of a space corresponding to the drawing file, and a location in a file server in which the drawing file is to be stored is determined based on the determined file name, wherein the file server comprises the first DB.

The operation of storing the object file in the first DB may include the operations of determining a file name of the object file on the basis of at least one selected from the group consisting of the drawing information, the object information about the inserted file, the attribute information about the inserted object, and the object space information based on the location on the drawing information into which the object has been inserted; and determining a location in the file server where the object file is to be stored on the basis of the determined file name and storing the object file in the determined location.

At least one selected from the group consisting of the drawing file and the object file may be encrypted and stored in the first DB. If the encrypted drawing file or the encrypted object file is selected, preview information of the selected file may be displayed on the basis of basic information and thumbnail image information that correspond to the drawing file or the object file. The facility management system providing method may be stored in a computer readable recording medium having a program recorded thereon.

According to an aspect of the present invention, there is provided a facility management system including an application for loading drawing information and inserting an object into the drawing information; a first DB for storing an object file, wherein the object file comprises object information about the inserted object, attribute information about the inserted object, and object space information about the inserted object from the application; a second DB for storing object text information corresponding to the object file stored in the first DB; and a control engine for operating the object file stored in the first DB and the object text information stored in the second DB together. The application is separate from a drawing manufacturing application for making a drawing file corresponding to the drawing information.

A file name of the drawing file may be determined based on information about a space corresponding to the drawing file, or a file name of the object file may be determined based on at least one selected from the group consisting of the drawing information, the object information about the inserted file, the attribute information about the inserted object, and the object space information based on the location on the drawing information into which the object has been inserted. A location in a file server where the drawing file or the object file is to be stored may be determined on the basis of the determined file name of the drawing file or the determined file name of the object file, wherein the file server comprises the first DB.

At least one selected from the group consisting of the drawing file and the object file may be encrypted and stored in the first DB. If the encrypted drawing file or the encrypted object file is selected, preview information of the selected file may be displayed on the application on the basis of basic information and thumbnail image information that correspond to the drawing file or the object file. The application may have at least one space information selected from the drawing information by a user and may display information about the object located in a space corresponding to the selected space information.

MODE FOR THE INVENTION

The attached drawings for illustrating preferred embodiments of the present invention are referred to in order to gain a sufficient understanding of the present invention, the merits thereof, and the objectives accomplished by the implementation of the present invention.

It will be understood that when a component is referred to as "transmitting" data to another component, it may directly transmit the data to the other component or the data may be transmitted to the other component via at least one other component. In contrast, when a component is referred to as "directly transmitting" data to another component, it will be understood that the data may be transmitted to the other component without passing through any other component. Hereinafter, the present invention will be described in detail by explaining preferred embodiments of the invention with reference to the attached drawings. Like reference numerals in the drawings denote like elements.

Figure 1:
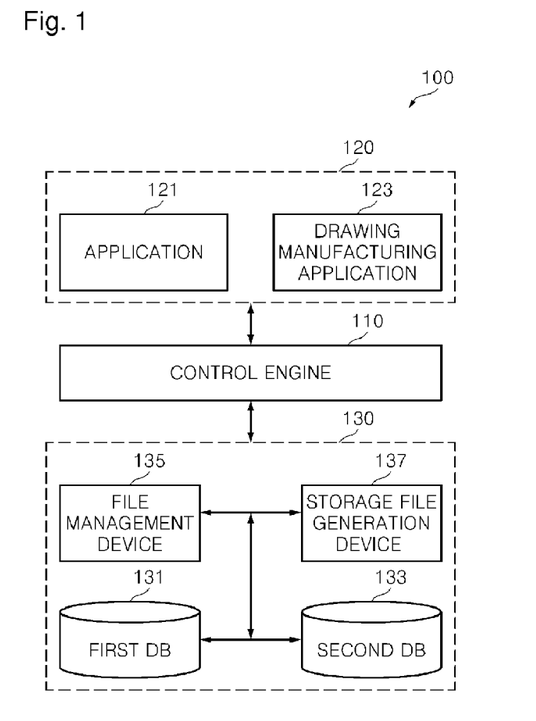
FIG. 1 is a schematic functional block diagram of a facility management system according to an embodiment of the present invention.

FIG. 1 is a schematic functional block diagram of a facility management system 100 according to an embodiment of the present invention.

Referring to FIG. 1, the facility management system 100 according to the present embodiment includes a control engine 110, a client 120, and a file server 130. The client 120 may denote an application that is installed in a terminal of a user and is connected to the facility management system 100 to perform a predetermined operation. The client 120 may include at least one selected from the group consisting of an application 121 and a drawing manufacturing application 123. The drawing manufacturing application 123 may denote an application for making a drawing of a facility (for example, a building or a space). For example, the drawing manufacturing application 123 may be a computer-aided design (CAD) program or a program capable of performing a function similar to that of the CAD program.

The application 121, which is a program separate from the drawing manufacturing application 123, reads a document file (for example, a file with an extension DWG, DWF, or RML) made by the drawing manufacturing application 123 and displays document information corresponding to the read-out document file. For example, the application 121 may be a viewer program of the drawing manufacturing application 123.

The application 121 may perform a function of inserting information corresponding to a predetermined object (for example, assets such as a desk, a chair, a PC, or furniture) into drawing information in order to achieve the technical spirit of the present invention. A user may insert the predetermined object into a desired position on the drawing information, which is displayed through the application 121, according to a drag and drop method by using the application 121. In addition, the application 121 may store several types of objects in a template form in advance. The user may select a template corresponding to an object desired to be added from among previously stored templates and insert the selected template into the drawing information.

As such, the technical spirit of the present invention may enable a user to simply insert an object using the application 121, which performs a smaller number of calculations and has a program significantly smaller than the drawing manufacturing application 123, instead of using the drawing manufacturing application 123, because the drawing manufacturing application 123 can only be manipulated by skilled users due to a large program and a complicate usage. Thus, although a drawing file may be generated after object insertion is performed using the drawing manufacturing application 123, the drawing manufacturing application 123 which is complicated does not need to be used to insert an object into a specific location. In addition, a user or manager of the facility management system 100 is little needed to install the expensive drawing manufacturing application 123 in order to insert predetermined object information into an already-made drawing file. Thus, although a user is not accustomed to using the drawing manufacturing application 123, the user may sufficiently perform a simple operation such as object insertion according to the application 121, thus leading to a large effect in terms of economy or usage convenience.

The user may simply perform object insertion by dragging and dropping a symbol corresponding to an object to a desired location (for example, a room) onto desired drawing information (for example, a drawing corresponding to a specific floor of a specific building) or by using a predetermined insertion method. The application 121 may provide a predetermined interface for inputting more various pieces of information (for example, the name, attribute, and the like of the object) about the object to be inserted. Alternatively, as described above, one may be selected and inserted from among various object templates of a predetermined form. Information corresponding to the object to be inserted may be generated as an object file and stored in the file server 130.

The file server 130 includes a first DB 131 and a second DB 133. The file server 130 may further include a file management device 135 and/or a storage file generation device 137. The first DB 131 may store a drawing file and an object file of the facility management system 100. The second DB 133 may store text information corresponding to the drawing file and text information corresponding to the object file. The control engine 110 may operate the first DB 131 and the second DB 133 together. In other words, if a drawing file and/or object file is added to the first DB 131, text information corresponding to the added drawing file and/or object file may be added to the second DB 133. If the drawing file and/or object file stored in the first DB 131 is changed, the text information corresponding to the drawing file and/or object file may be changed.

The file management device 135 stores a drawing file and/or object file generated or corrected by the client 120 in the first DB 131 according to the technical spirit of the present invention. At this time, the file management device 135 may store the drawing file and/or object file according to a predetermined rule according to the technical spirit of the present invention. The storage file generation device 137 may encrypt and store the drawing file and/or object file and also generate a predetermined storage file so that the user may check basic information of the encrypted drawing file and/or object file without decrypting the encrypted drawing file and/or object file. In other words, when the storage file generation device 137 is requested by the control engine 110 to store the drawing file and/or object file, the storage file generation device 137 may generate the predetermined storage file, and the name and storage location of the generated storage file may be controlled by the file management device 131.

Figure 2:
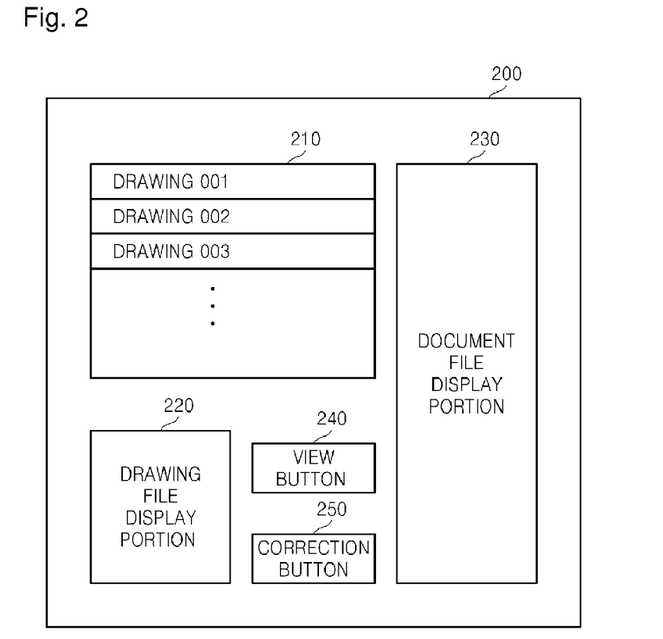
FIG. 2 illustrates a structure of a user interface displayed to a client.

FIG. 2 illustrates a structure of a user interface 200 displayed to a client. Referring to FIG. 2, the user interface 200 includes a drawing list portion 210 that displays a list of a plurality of drawing files, a drawing display portion 220 that displays a selected drawing file (for example, a file with extension DWG, DWF, or RML), a document display portion 230 that displays a document file (for example, a file with extension HWP, DOC, XLS, PPT, or PDF) that corresponds to the selected drawing file and includes various types of text data included in the selected drawing file, and a plurality of buttons, namely, a view button 240 and a correction button 250. The user interface 200 illustrated in FIG. 2 may be variously changed and variously embodied.

Figure 3:
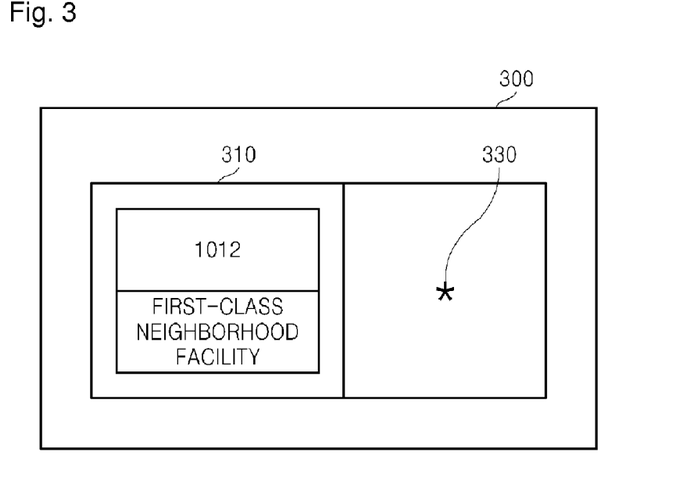
FIG. 3 illustrates a client interface on which a drawing manufactured according to a drawing manufacturing application is displayed.
Figure 4:
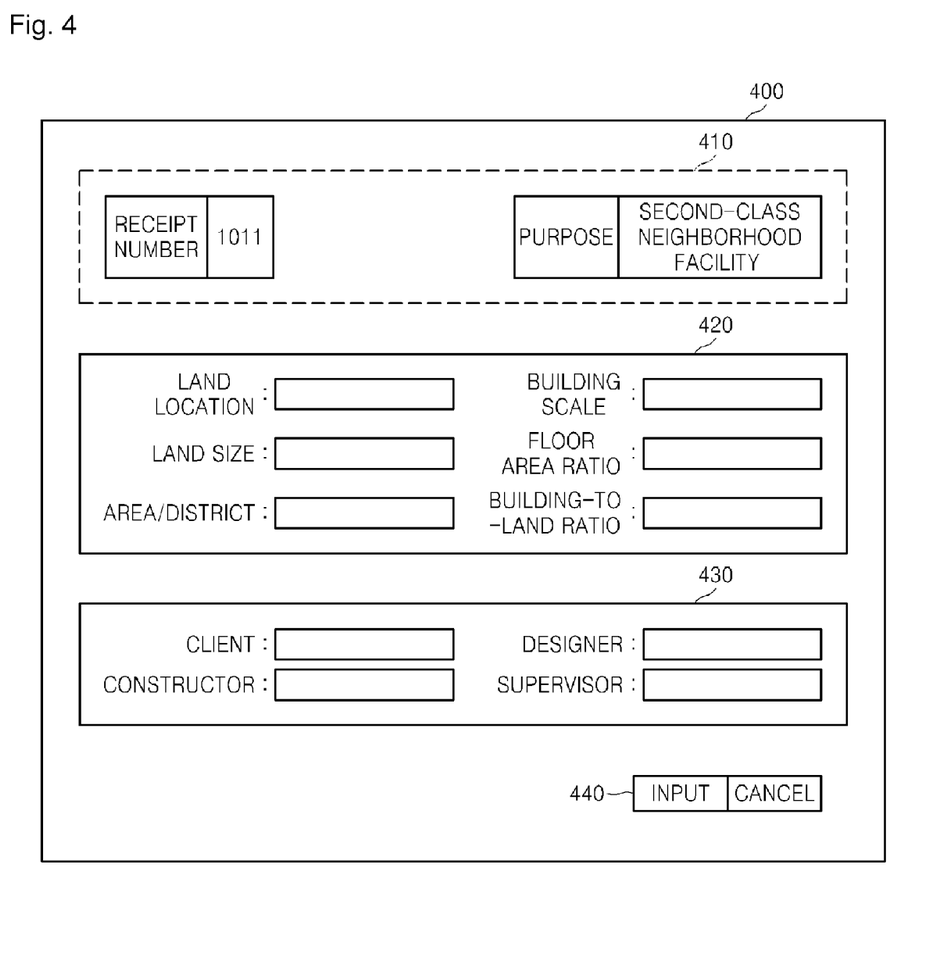
FIG. 4 illustrates a user graphic interface that is activated when new data is desired to be input to the drawing illustrated in FIG. 3.
Figure 5:
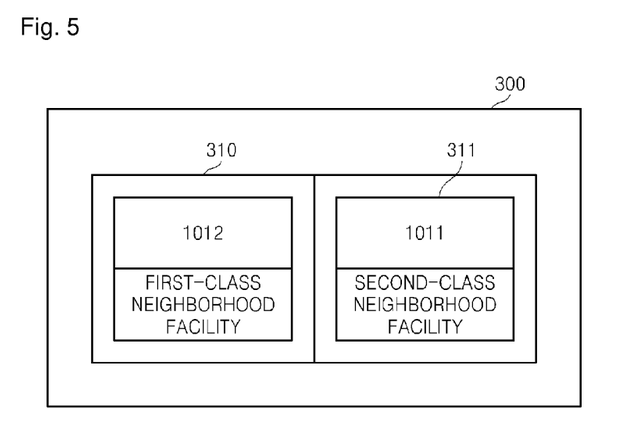
FIG. 5 illustrates a client interface on which a drawing in which input data has been reflected is displayed.

FIG. 3 illustrates a client interface 300 on which a drawing 310 manufactured according to a drawing manufacturing application is displayed. FIG. 4 illustrates a user graphic interface 400 that is activated when new data is desired to be input to the drawing 310. FIG. 5 illustrates a client interface 300 on which a drawing 310 in which input data 311 has been reflected is displayed.

Referring to FIGS. 2 through 5, when a user selects a drawing file (for example, drawing 002) to be changed from the drawing list portion 210, the selected drawing file (for example, drawing 002) is displayed in a preview format on the drawing display portion 220. At this time, the user may see the selected drawing file (for example, drawing 002) by clicking the view button 240.

If the user clicks the correction button 250, the client 120 may receive the selected drawing file (for example, drawing 002) from the file server 130 and load a predetermined interface for correcting the selected drawing file (for example, drawing 002). The control engine 110 may extract the selected drawing file from the first DB 131 and transmit the selected drawing file to the client 120. The control engine 110 may extract a document file corresponding to the selected drawing file from the second DB 133 and transmit the document file to the client 120. The drawing file includes graphic data and first text data, and the document file includes the first text data.

When the drawing file and the document file are transmitted to the client 120, the drawing manufacturing application 123 (for example, an Autocad program) installed in the client 120 opens the downloaded drawing file. Thus, a drawing file (or a drawing) selected to be corrected by the user is displayed on a screen of the client 120 by the drawing manufacturing application 123. Thus, the user may correct the drawing file according to the predetermined CAD program.

If the user desires to input new text data (hereinafter, referred to as 'second text data') to the drawing 310 displayed on the client interface 300, the user may perform a drawing correction command of the drawing manufacturing application 123. The drawing manufacturing application 123 may request the user to input a location on the drawing 310 to which the second text data is to be input.

At this time, if the user inputs a location 330 to which the second text data is to be input through a predetermined input device (for example, a mouse, a keyboard, or the like), that is, if the drawing manufacturing application 123 receives location information about the location on the drawing 310 to which the second text data is to be input, the drawing manufacturing application 123 of the client 120 generates a data input window 400 as illustrated in FIG. 4. For example, the data input window 400 may include a region 410 to which text data is input, and the region 410 may include a window through which first data (for example, '1011' corresponding to a receipt number) is input and a window through which second data (for example, 'a second-class neighborhood facility' corresponding to the purpose of use) is input.

The data input window 400 may further include a region 420 to which information other than graphic information (for example, construction information such as 'land location', 'building scale', 'land size', 'floor area ratio', 'area/district', and a building-to-land ratio) is input, and/or a region 430 to which information about design/construction/electricity/air-conditioning/other facilities of 'a client', 'designer', 'constructor', 'a supervisor', etc., is input. Thus, if the user inputs the second text data (for example, '1011' and the 'second-class neighborhood facility') to the region 410 through the data input window 400 as illustrated in FIG. 4 and clicks an 'input' button 440, the second text data (for example, '1011' and 'second-class neighborhood facility') input by the user is displayed as graphic (for example, a rectangle) and text data 311, including '1011' and 'second-class neighborhood facility', at the location 330 initially selected by the user on the drawing 310.

At this time, the second text data (for example, '1011' and the 'second-class neighborhood facility') input through the data input window 400 is directly reflected (or stored) in the document file transmitted to the client 120. Thus, the second text data added to the drawing 310 is automatically included in the document file, and thus the text data of the drawing file is consistent with the text data of the document file. The user may store a drawing file in which the second text data has been reflected and a document file in which the second text data has been reflected, according to a data storage command (for example, 'save', 'save as' or the like).

In addition, the user may upload the drawing file in which the second text data has been reflected and the document file in which the second text data has been reflected, to the file server 130 according to an upload command. In other words, the client 120 may transmit the drawing file including the second text data and the document file including the second text data to the file server 130 in response to the upload command. Alternatively, the client 120 may transmit the drawing file including the second text data and the second text data to the file server 130 in response to the upload command.

The file server 130 updates an existing drawing file stored in the first DB 131 on the basis of the drawing file including the second text data and updates an existing document file stored in the second DB 133 on the basis of the second text data or the document file including the second text data. In addition, the file server 130 may store a not-updated drawing file and/or not-updated document file in the first DB 131 and/or the second DB 133, respectively, in the form of a backup file when the existing drawing file and the existing document file are updated. The file server 130 may include a separate DB (not shown) for storing not-updated drawing files and/or not-updated document files.

Thus, if the text data of the drawing file is corrected, the corrected text file may also be reflected or stored in the document file in real time. The user may not only add text data to the drawing 310 of FIG. 3 but also insert an object into the drawing 310, by using the client 120. At this time, although the user may insert the object into the drawing 310 by using the drawing manufacturing application 123, the facility management system 100 according to the present embodiment inserts the object by using the application 121.

Figure 6:
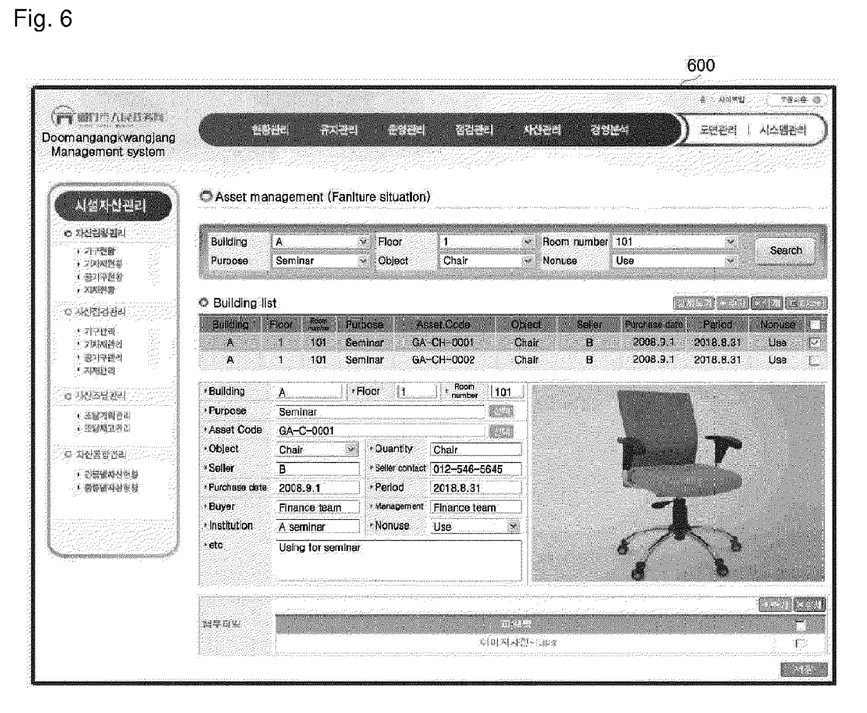
FIG. 6 illustrates a screen used to input attribute information of an object by using an application in the facility management system illustrated in FIG. 1.
Figure 7:
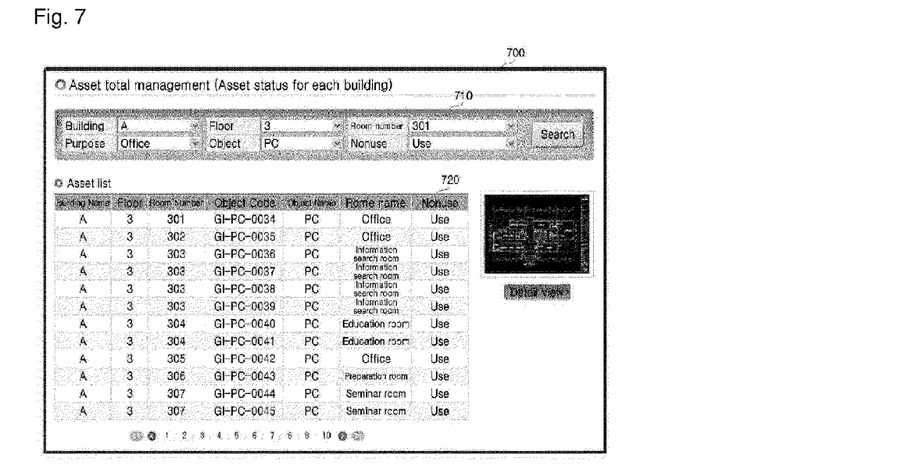
FIG. 7 illustrates a case where text information corresponding to an object file is stored in the facility management system illustrated in FIG. 1.
Figure 8:
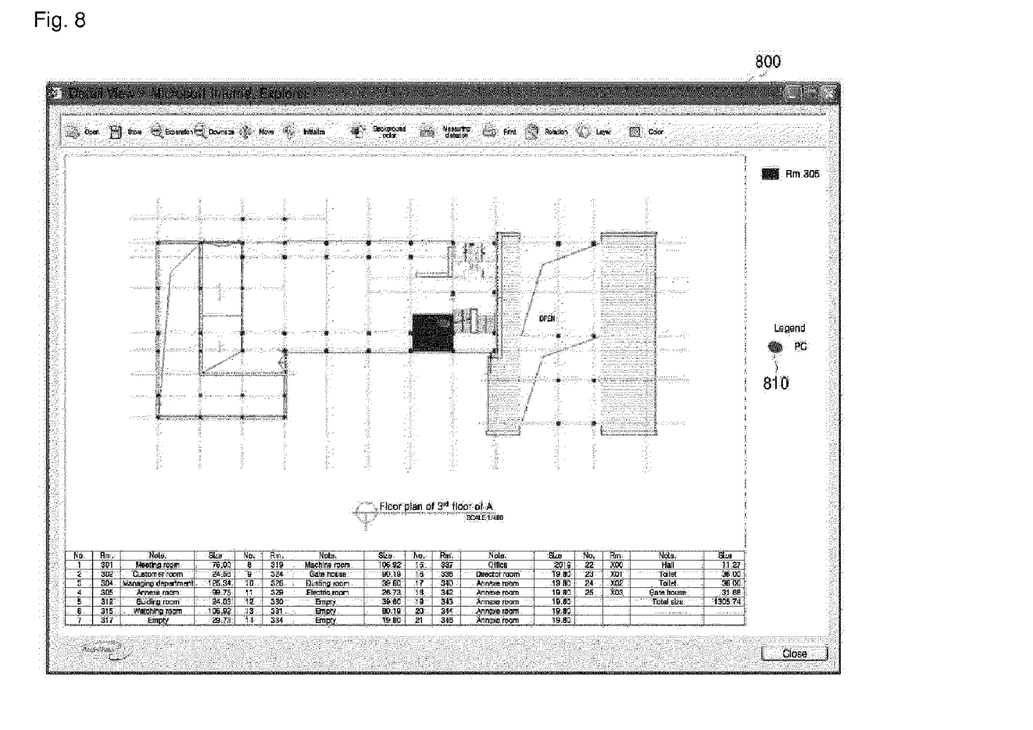
FIG. 8 is a view for illustrating a method of performing object insertion by using an application in the facility management system illustrated in FIG. 1.

FIG. 6 illustrates a screen used to input attribute information of an object by using the application 121 in the facility management system 100 illustrated in FIG. 1. FIG. 7 illustrates a case where text information corresponding to an object file is stored in the facility management system 100 illustrated in FIG. 1. FIG. 8 is a view for illustrating a method of inserting an object by using the application 121 in the facility management system 100 illustrated in FIG. 1.

Referring to FIGS. 6 through 8, when the user selects a specific interface of the application 121, the user may be provided with an interface 600 through which information about the object to be inserted as illustrated in FIG. 6 can be input. A template corresponding to the object to be inserted may be selected from templates previously stored in the application 121. For example, the application 121 may store information about objects such as a chair, furniture, a PC, a desk, etc. in the form of a template, and the user may select the object to be inserted by selecting one from among the stored templates. If the selected template includes information to be corrected, the information may be corrected using the interface 600. The user may input object information (for example, a chair, furniture, or a desk) of the object to be inserted and attribute information (for example, the characteristics, price, or user or nonuse) of the object to be inserted, by using the interface 600.

The attribute information of the object input or stored in a template may vary according to embodiments. The user may also input information about a location into which the object is to be inserted, in a text format through the interface 600. In this case, the location into which the object is to be inserted should be represented as predetermined identification information on a drawing into which the object is to be inserted (for example, a drawing as illustrated in FIG. 8). For example, if information corresponding to the name, floor, and room number of a building is input through the interface 600, the object may be inserted into a drawing as illustrated in FIG. 8. The object inserted may be displayed as a predetermined symbol (for example, a chair-shaped symbol or the like) on the drawing.

According to another embodiment of the present invention, the user may input information about an object to be newly inserted, through the interface 600 of FIG. 6. When the information about the object is input, a drawing interface 800 illustrated in FIG. 8 may be activated. A symbol 810 corresponding to the to-be-inserted object input through the interface 600 may be displayed on a predetermined portion of the drawing interface 800. The user may move the symbol 810 to the location into which the object is to be inserted, through an input device (for example, a mouse). A symbol 810-1 located by moving the symbol 810 is as illustrated in FIG. 8.

As described above, when a drawing file already exists, a complicate and large program such as the drawing manufacturing application 123 may not be needed to insert a predetermined object into drawing information (for example, drawing information as illustrated in FIG. 8) corresponding to the drawing file. Accordingly, the technical spirit of the present invention provides the application 121 capable of displaying a drawing file as illustrated in FIG. 8, inserting an object, and inputting information about the object as illustrated in FIG. 6. Thus, the user does not need to learn how to use the drawing manufacturing application 123 in order to insert the object, and the object may be sufficiently inserted by the application 121.

When the object is inserted using interfaces as illustrated in FIGS. 6 and 8, information about the inserted object may be stored as an object file. However, the user needs to specially manage a list (text information) of objects included in a specific space as illustrated in FIG. 7, in the form of a text. Information in the text form denotes information other than graphic information, and an asset list in the text form may be embodied into various codes.

In the conventional art, to achieve this, while an asset list as illustrated in FIG. 7 is separately managed, information about inserted object needs to be separately input to the asset list after the object is inserted. However, in the facility management system 100 according to the present embodiment, when an object is inserted into a drawing, the asset list as illustrated in FIG. 7 may be updated automatically.

To achieve this, the control engine 110 may be installed in at least one selected from the group consisting of a user computer in which the client 120 is installed and a server (not shown) connected to the file server 130.

When the object is inserted through the application 121 as described above with reference to FIGS. 6 and 8, an object file corresponding to the inserted object may be generated. When the user updates or uploads the object file, the control engine 110 may extract object space information (that is, a location into which the object has been inserted) from the object file and write the object space information to corresponding items (for example, a building name, a floor, and a room number) on a text list (for example, the asset list of FIG. 7) stored in the second DB 133. In addition, object information (for example, the type or unique ID of an object) and object attribute information (for example, a size, a price, possibility or non-possibility of use, etc.) which are included in the object file may be written to their corresponding items on the text list stored in the second DB 133. To achieve this, the control engine 110 may generate, as object text information, object space information, object information, and object attribute information included in the object file and store the object text information in the second DB 133.

For example, when the user inserts an object (for example, a chair) into a drawing corresponding to building A, floor B, and room C through the application 121 and perform an update or upload command, the control engine 110 may extract object space information (building A, floor B, and room C), object information (a chair and a unique ID), and object attribute information from the object file to generate object text information, and update the text list stored in the second DB 133 with the object text information.

Accordingly, the object file may be stored in the first DB 131, and the object text information corresponding to the object file may be stored in the second DB 133. In addition, the user may select a predetermined space (for example, a room) from the drawing as illustrated in FIG. 8. Then, the application 121 may display information (for example, an asset list) about objects included in the selected space, as illustrated in FIG. 7.

The file server 130 may include the file management device 135. The file management device 135 may receive a drawing file and/or object file generated or corrected by the client 120 through the control engine 110. The drawing file and/or object file may have a file name given by the user. However, when a plurality of users are able to manage facilities by accessing the facility management system 100, if the users give respective desired file names to a generated or corrected drawing file and/or object file, a plurality of drawing files and/or object files may be stored for a single space. In addition, if the file server 130 is implemented as a web disk or a web hard, a drawing file and/or object file may be uploaded to different locations for users.

To address these problems, the file management device 135 may determine a file name according to a predetermined rule regardless of a file name given by the user, and may determine a location in the file server 130 where the drawing file and/or object file is to be stored on the basis of the determined file name. The location in which the drawing file and/or object file is to be stored may not denote a physical location in the file server 130 but a logical location (for example, a location on a folder structure as illustrated in FIG. 10) in the file server 130.

Figure 9:
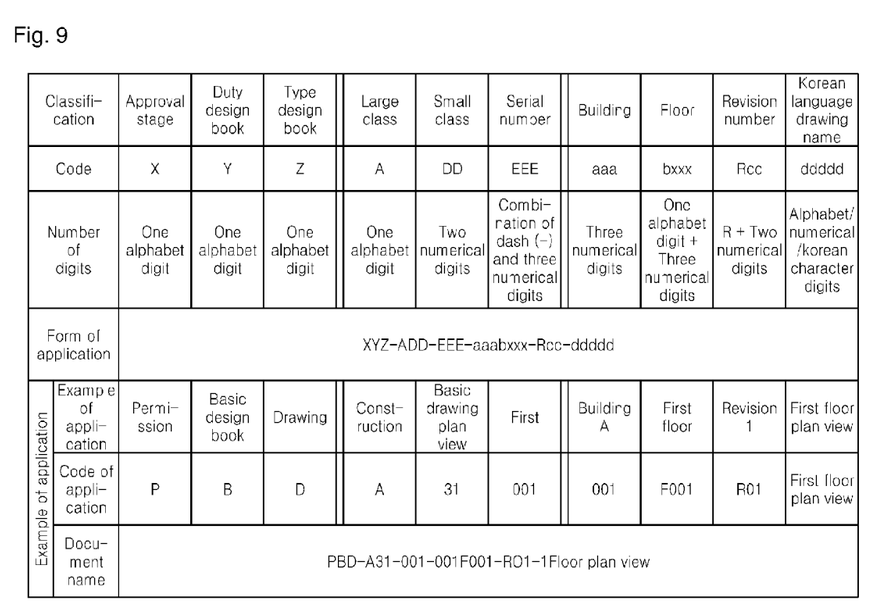
FIG. 9 illustrates an example of a file name classification system stored in a file management device included in the facility management system illustrated in FIG. 1.

FIG. 9 illustrates an example of a file name classification system stored in the file management device 135 illustrated in FIG. 1. FIG. 10 illustrates a folder structure 900 of the first DB 131 illustrated in FIG. 1 and a result obtained by storing files in the first DB 131 according to the file name classification system illustrated in FIG. 9.

Figure 10:
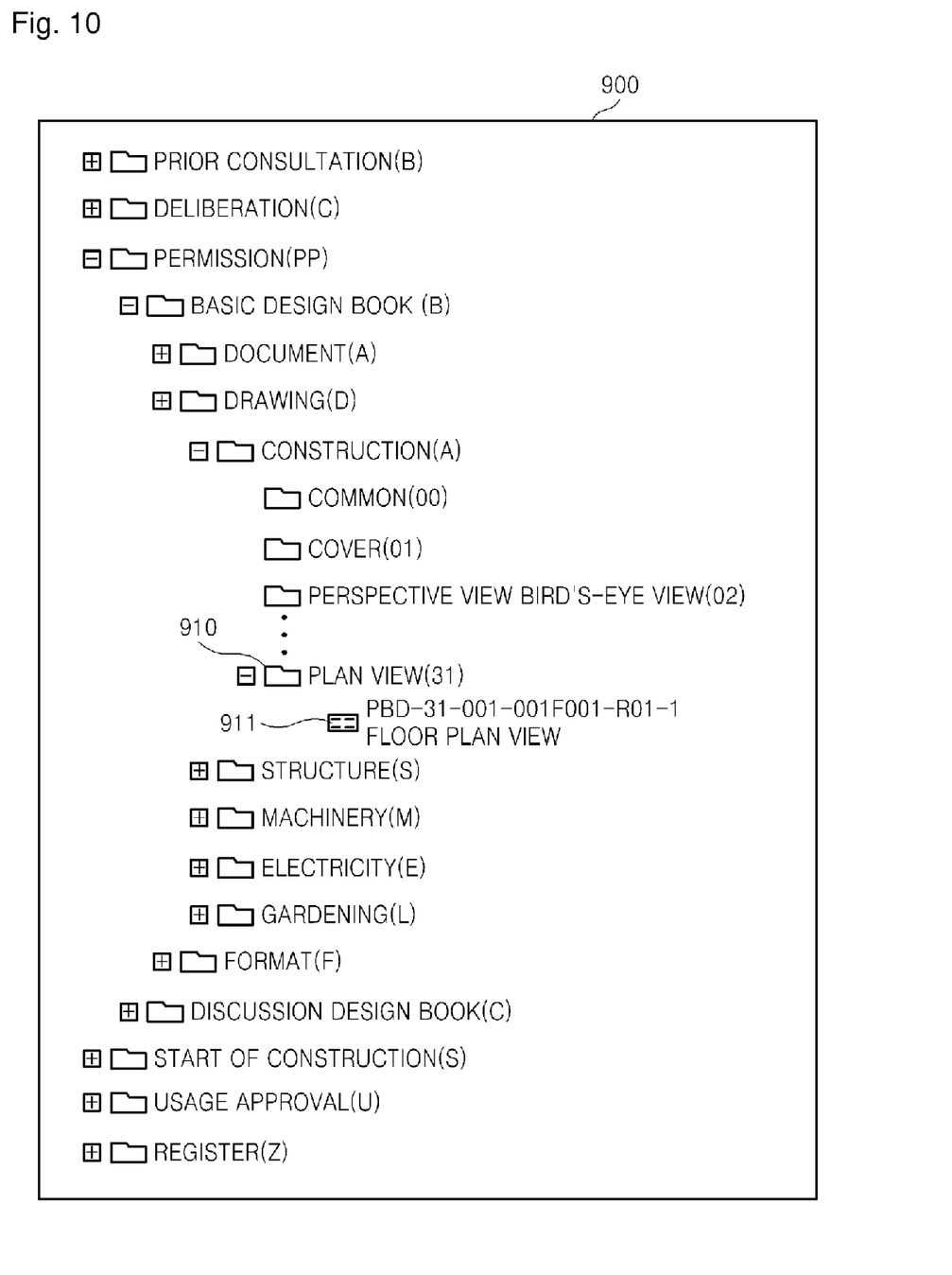
FIG. 10 illustrates a folder structure of a database (DB) according to an embodiment of the present invention and a result obtained by storing files in the DB according to the file name classification system illustrated in FIG. 9.

Referring to FIGS. 9 and 10, the file management device 135 stores information about the file name classification system which is to be used in the facility management system 100 as illustrated in FIG. 9. In an embodiment of the present invention, the file server 130 may be implemented into a web disk or a web hard.

Referring to FIG. 9, the file name classification system includes respective codes corresponding to classes and definitions of the number of alphabet/numeral digits that constitute each of the codes. The first DB 131 of the file server 130 includes the folder structure 900 of FIG. 10 which is obtained on the basis of the information about the file name classification system of FIG. 9 stored in the file management device 135.

The folder structure 900 may denote a tree structure of folders formed on the basis of the file name classification system of FIG. 9. Information about the file name classification system of FIG. 9 may be written in an XML file (or a template file).

The file management device 135 receives a drawing file and/or object file having a name given by a user, which is transmitted or uploaded from the client 120. The file management device 135 may extract text information from the drawing file and/or object file and determine a new file name according to the file name classification system of FIG. 9. When the name of the drawing file and/or object file is replaced by the determined file name, the drawing file and/or object file having the new file name is stored in the first DB 131.

A file name classification system for an object file may also be defined according to the types of information included in the object file, in a method similar to a method of defining the file name classification system for a drawing file illustrated in FIG. 9.

When each class of FIG. 9 is described, an approval stage class may be divided into prior consultation (B), deliberation (C), permission (P), start of construction (S), usage approval (U), and register (Z). A duty design book class may be divided into a basic design book (B) and a discussion design book (C). A type design book class may be divided into a document (A), a drawing (D), and a format (F). A large class may be divided into construction, structure, machinery, electricity, and gardening (L). A small class is divided into a plurality of codes each having two numerical digits, and a serial number 311 uses a combination of a dash (-) and three numerical digits and may start with "001" for a first document. A building class uses three numerical digits and may start with "001" for a first building. However, even when a drawing includes a single building, the building class may be given "001". A floor class may be classified by combining one alphabetic digit that identifies the floor of the drawing with three numerical digits that represent a floor number. A revision number class uses a combination of a revision symbol "R" and two numerical digits, for example, "R01" or "R02", and may start with "01" for an initially manufactured file. A Korean language drawing name may be given variously.

If a file name is determined according to the file name classification system described above, a file uploaded by a user shows that information included in a drawing file has been reflected in a file name "PBD-A31-001-001F001-R01-1 floor plan view" according to a predetermined rule. According to the file name, a location in which the file is to be stored may be automatically determined. For example, the file "PBD-A31-001-001F001-R01-1 floor plan view" is stored in a 'plan view' folder corresponding to '31' from among the subfolders of a 'construction' folder corresponding to 'A' from among the subfolders of a 'drawing' folder corresponding to 'D' from among the subfolders of a 'basic design book' folder corresponding to 'B' from among the subfolders of a 'permission' folder corresponding to 'P'.

For example, a user may make a drawing file using the client 120 and give name A to the drawing file. The user may upload the drawing file A to the file server 130. At this time, the user may upload the drawing file A to any folder illustrated in FIG. 10. The upload may be performed according to any one selected from the group consisting of a drag and drop command, a copy command, and a move command.

Then, the file management device 135 changes the file name A to a file name 911 called "PBD-A31-001-001F001-R01-1 floor plan view". The drawing file may be stored in a folder 910 of FIG. 10 on the basis of the changed file name 911.

In the present embodiment, for convenience of explanation, the file name A of the file uploaded to the file server 130 is changed to a name called "PBD-31-001-001F001-R01-1 floor plan view". However, the name A may be changed to any of various names such as "PBD-31-001-001F001-R01-1 floor plan view-A" and "PBD-31-001-001F001-R01" according to a predetermined standardized code. A standard code formed of English characters and numbers may be changed to a standard name formed of a combination of Korean characters and numbers.

In other words, a file name arbitrarily given by a user is changed to a code or name standardized according to the file name classification system of FIG. 9, but the contents of the file may not be changed. No matter what folder the user uploads the file to, the file may be stored in a folder that is supposed to store the file.

Accordingly, even if a plurality of users upload documents having different names to respective desired folders, the names of the uploaded documents are changed to standard names based on a standardized code. Thus, the documents may be uploaded to corresponding folders regardless of a sequence in which the documents are manufactured, and the use of the standardized code may facilitate document management.

As described above the file server 130 illustrated in FIG. 1 may further include the storage file generation device 137. The storage file generation device 137 encrypts important files (for example, a drawing file and/or object file) that require security, and generates a storage file. The storage file may include basic information. The basic information included in the storage file may be unencrypted. The basic information may allow users to briefly check the contents of an encrypted storage file without needing to decrypt the encrypted storage file.

Figure 11:
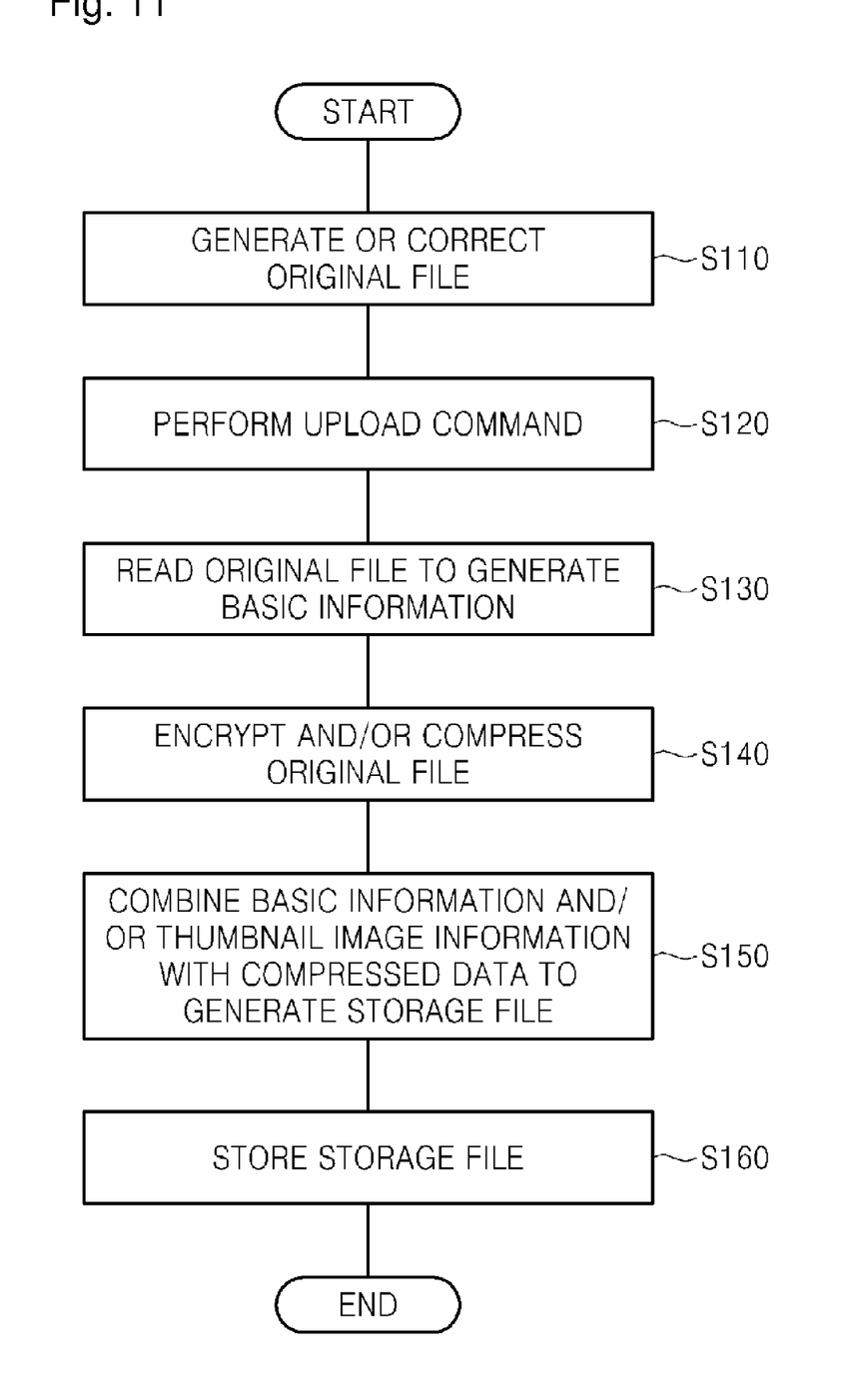
FIG. 11 is a flowchart of a storage file generating method performed in the facility management system illustrated in FIG. 1, according to an embodiment of the present invention.

FIG. 11 is a flowchart of a storage file generating method performed in the facility management system 100 illustrated in FIG. 1.

Referring to FIG. 11, in operation S110, a user may generate or correct an original file (for example, a drawing file and/or object file) by using the client 120. Thereafter, when an upload command is performed to upload the original file into the file server 130 in operation S120, the storage file generation device 137 receives and reads the original file to generate separate fundamental information. At this time, if a text input by the user, for example, a description about the original file, exists in the original file, the text may be included in the fundamental information. The basic information briefly represents the original file and thus may include the title, brief explanation, generation date, and generator of the original file. As described above, the original file may be any type of file.

An existing document file (for example, a .dwg file, a .doc file, a .hwp file, or the like) may include document summary information in the original file. In this case, the storage file generation device 137 may generate the basic information by using the document summary information included in the original file, in operation S130. The storage file generation device 137 may further generate a thumbnail image capable of briefly showing an image on which the original file is displayed. In operation S140, the storage file generation device 137 encrypts and/or compresses the original file. To encrypt and/or compress the original file, the storage file generation device 137 may include a predetermined encryption module and/or a predetermined compression module.

In operation S150, the basic information and/or thumbnail image information are combined with compressed data obtained by compressing the original file. At this time, the basic information and/or thumbnail image information is not compressed.

Figure 13:
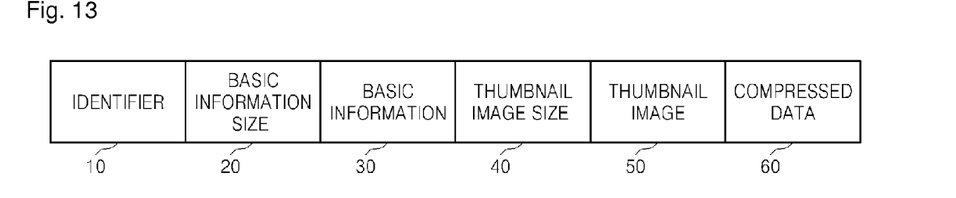
FIG. 13 illustrates an example of a format of a storage file according to an embodiment of the present invention.

FIG. 13 illustrates an example of a format of a storage file according to an embodiment of the present invention. Referring to FIG. 13, the storage file may include an identifier 10, a basic information size 20, basic information 30, a thumbnail image size 40, a thumbnail image 50, and compressed data 60.

The identifier 10 identifies whether a file is in a storage format. The identifier 10 also identifies the type of storage file. For example, identifier 'ZD' may indicate that the original file not yet turned into the storage file is a document file, for example, a storage file having an extension doc, hwp, or ppt, and identifier 'ZC' may indicate that the original file not yet turned into the storage file is a CAD file, for example, a storage file having an extension dwg, dxf, or dgn. In addition, identifier 'ZR' may indicate that the original file not yet turned into the storage file is a raster file, for example, a storage file having an extension tif, jpg, or bmp. Identifiers other than the identifiers 'ZD', 'ZC', and 'ZR' may also be used.

The basic information size 20 is data that represents the size of the basic information 30 stored in the storage file. Since the size of the basic information 30 may vary, the basic information size 20 representing the size of the basic information 30 may be included in the storage file. As described above, the basic information 30 briefly represents the original file. The thumbnail image size 40 is data that represents the size of the thumbnail image 50. The thumbnail image 50 is used to support a thumbnail function of the original file, and shows the entire file image written to a specific portion of the original file in a reduced-size preview form.

The user may more easily check the type of original file through the thumbnail image 50. Accordingly, the format of the storage file may include the thumbnail image 50 in addition to the basic information 20. If the user selects an encrypted/compressed file, basic information and/or a thumbnail image may be recognized although they are not decrypted/decompressed. The compressed data 60 is obtained by encrypting and compressing the original file. Referring back to FIG. 11, in operation S160, the generated storage file may be stored in the file server 130.

Figure 12:
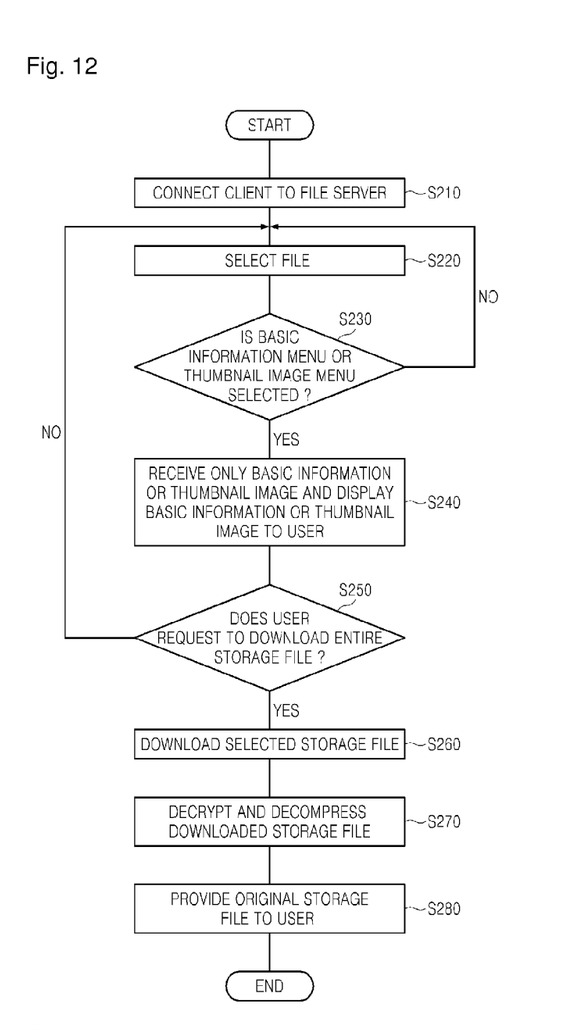
FIG. 12 is a flowchart of a method for a client to use a storage file, according to an embodiment of the present invention.

FIG. 12 is a flowchart of a method for the client 120 to use a storage file, according to an embodiment of the present invention. Referring to FIG. 12, the client 120 may be connected to the file server 130 in operation S210 and thus receive a file list including files that may be selected. For example, the client 120 may receive the drawing file list 210 of FIG. 2. In operation S220, a user may select a file from the file list or select a file from files found using a file search function.

If the selected file is a storage file, menus such as a basic information menu, a thumbnail image menu, and an overall file download menu may exist so that the user selects a desired menu. When the user requests for basic information about the storage file, for example, when the basic information menu or the thumbnail image menu is selected in operation S230, the client 120 may receive only the basic information or the thumbnail image included in the corresponding storage file from the storage file generation device 137 and display the basic information or the thumbnail image to the user, in operation S240. To simplify this operation, when a specific storage file is selected, basic information and/or a thumbnail image of the specific storage file may be automatically extracted and provided to the user.

Then, when the user requests to download the entire storage file, for example, when the overall download menu is selected in operation S250, the selected storage file is downloaded, in operation S260. Next, in operation S270, the client 120 decrypts and decompresses the downloaded storage file, more specifically, compressed data (for example, the compressed data 60 of FIG. 13) of the storage file obtained by compressing the original storage file to extract the original storage file. Then, in operation S280, the client 120 may provide the original storage file to the user.

A facility management system providing method according to an embodiment of the present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

A facility management system according to the present invention may be applied to remote control of facilities.

The invention claimed is:

1. A facility management system providing method comprising:
   storing an object file in a first database (DB) if an object is inserted into drawing information according to an application, wherein the object file comprises object information about the inserted object, attribute information about the inserted object, and object space information based on a location on the drawing information into which the object is inserted; and
   updating object text information corresponding to the object file on the basis of the object information, the attribute information, and the object space information included in the object file in a second DB, wherein the second DB stores text information corresponding to the first DB, wherein a file name of a drawing file corresponding to the drawing information is determined based on information about attributes of a space corresponding to the drawing file, and a location in a file server in which the drawing file is to be stored is determined based on the determined file name, wherein the file server comprises the first DB, and wherein the storing of the object file in the first DB comprises:

determining a file name of the object file on the basis of at least one selected from the group consisting of the drawing information, the object information about the inserted file, the attribute information about the inserted object, and the object space information based on the location on the drawing information into which the object has been inserted; and determining a location in the file server where the object file is to be stored on the basis of the determined file name and storing the object file in the determined location.

2. The facility management system providing method of claim 1, further comprising:

selecting the drawing file, wherein the selecting is performed by a client; and transmitting the drawing information corresponding to the selected drawing file to the client.

3. The facility management system providing method of claim 2, wherein the application is separate from a drawing manufacturing application for displaying the drawing file as the corresponding drawing information and making the drawing file.

4. The facility management system providing method of claim 1, wherein the application displays a result obtained by reflecting a symbol corresponding to the inserted object in the drawing information on the basis of the object space information.

5. The facility management system providing method of claim 1, further comprising:

selecting space information, wherein the selecting is performed by a client;

searching for information about the object located in a space corresponding to the selected space information from the second DB; and displaying the found information.

6. The facility management system providing method of claim 1, further comprising:

if an attribute of the object inserted through the application is changed, updating the object file stored in the first DB on the basis of the changed attribute; and updating the object text information stored in the second DB on the basis of the changed attribute.

7. The facility management system providing method of claim 1, wherein:

at least one selected from the group consisting of the drawing file and the object file is encrypted and stored in the first DB; and if the encrypted drawing file or the encrypted object file is selected, preview information of the selected file is displayed on the basis of basic information and thumbnail image information that correspond to the drawing file or the object file.

8. A non-transitory computer readable recording medium having recorded thereon a program for executing the facility management system providing method of claim 1.

9. A computer processor for facility management system comprising:

a memory:

an application for loading drawing information and inserting an object into the drawing information;

a first database (DB) for storing an object file, wherein the object file comprises object information about the inserted object, attribute information about the inserted object, and object space information about the inserted object from the application;

a second DB for storing object text information corresponding to the object file stored in the first DB; and a control engine for operating the object file stored in the first DB and the object text information stored in the second DB together, wherein the application is separate from a drawing manufacturing application for making a drawing file corresponding to the drawing information, and wherein a file name of the drawing file is determined based on information about a space corresponding to the drawing file, or a file name of the object file is determined based on at least one selected from the group consisting of the drawing information, the object information about the inserted file, the attribute information about the inserted object, and the object space information based on the location on the drawing information into which the object has been inserted; and a location in a file server where the drawing file or the object file is to be stored is determined on the basis of the determined file name of the drawing file or the determined file name of the object file, wherein the file server comprises the first DB.

10. The facility management system of claim 9, wherein:

at least one selected from the group consisting of the drawing file and the object file is encrypted and stored in the first DB; and if the encrypted drawing file or the encrypted object file is selected, preview information of the selected file is displayed on the application on the basis of basic information and thumbnail image information that correspond to the drawing file or the object file.

11. The facility management system of claim 9, wherein the application has at least one space information selected from the drawing information by a user and displays information about the object located in a space corresponding to the selected space information.

* * * * *